United States Patent
Tran et al.

(10) Patent No.: US 9,026,310 B2
(45) Date of Patent: May 5, 2015

(54) WADING DEPTH ESTIMATION FOR A VEHICLE

(75) Inventors: Thuy-Yung Tran, Whitley (GB); Edward Hoare, Whitley (GB); Nigel Clarke, Bridgnorth (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 13 days.

(21) Appl. No.: 13/994,507

(22) PCT Filed: Dec. 15, 2011

(86) PCT No.: PCT/EP2011/072997
§ 371 (c)(1),
(2), (4) Date: Jul. 24, 2013

(87) PCT Pub. No.: WO2012/080438
PCT Pub. Date: Jun. 21, 2012

(65) Prior Publication Data
US 2014/0324288 A1    Oct. 30, 2014

(30) Foreign Application Priority Data

Dec. 15, 2010  (GB) .................................. 1021268.6
Dec. 15, 2010  (GB) .................................. 1021272.8
Dec. 15, 2010  (GB) .................................. 1021278.5
Dec. 15, 2010  (GB) .................................. 1021295.9
Dec. 15, 2010  (GB) .................................. 1021296.7
Dec. 15, 2010  (GB) .................................. 1021297.5

(51) Int. Cl.
*B60W 40/076*   (2012.01)
*B60K 35/00*    (2006.01)
(Continued)

(52) U.S. Cl.
CPC ................ *B60K 35/00* (2013.01); *G01F 23/28* (2013.01); *B60G 17/01908* (2013.01); *G01F 23/00* (2013.01); *G01F 23/296* (2013.01); *G01F 23/18* (2013.01); *B60G 17/0165* (2013.01);
(Continued)

(58) Field of Classification Search
CPC .............. B60W 40/06; B60W 40/076; B60W 2050/146; B60W 2420/54; B60W 2550/14; B60W 2550/142; B60W 2520/16; B60W 2520/18; B60G 2400/80; B60G 2400/843; B60G 2500/30; B60G 2800/914; B60G 17/01908; B60G 2300/07; B60G 17/019; B60G 17/0165; G01F 23/00; G01F 23/18; G01F 23/28; G01F 23/296
USPC ............ 701/36, 37, 45, 49; 340/440; 367/908
See application file for complete search history.

(56) References Cited

U.S. PATENT DOCUMENTS 6,389,955 B1 *  5/2002  Schaefer ........................... 92/86
7,062,962 B2 *  6/2006  Pasternack et al. ........ 73/170.29

(Continued)

FOREIGN PATENT DOCUMENTS

DE    102004028157 B3    1/2006
GB       2376929 A       12/2002

OTHER PUBLICATIONS

International Search Report for PCT/EP2011/072997 dated May 16, 2012, 5 pages.

*Primary Examiner* — Russell Frejd
(74) *Attorney, Agent, or Firm* — Reising Ethington P.C.

(57) ABSTRACT

A predictive method of detecting the depth of water ahead of a wading vehicle comprises providing a wading sensor and an attitude sensor on the vehicle, and using this information to estimate the depth of water at a location ahead of the direction of vehicle movement. Corresponding apparatus is disclosed.

18 Claims, 9 Drawing Sheets

(51) Int. Cl.
| | |
|---|---|
| *G01F 23/28* | (2006.01) |
| *B60G 17/019* | (2006.01) |
| *G01F 23/18* | (2006.01) |
| *B60G 17/0165* | (2006.01) |
| *B60W 40/06* | (2012.01) |
| *B60W 50/14* | (2012.01) |
| *B60K 37/02* | (2006.01) |
| *F02D 11/10* | (2006.01) |
| *G01F 23/14* | (2006.01) |
| *G01S 15/02* | (2006.01) |
| *G01K 13/00* | (2006.01) |
| *B60Q 1/00* | (2006.01) |
| *B60R 99/00* | (2009.01) |
| *G01F 23/24* | (2006.01) |
| *G01F 23/26* | (2006.01) |
| *G06F 7/00* | (2006.01) |
| *G01F 23/00* | (2006.01) |
| *G01F 23/296* | (2006.01) |

(52) U.S. Cl.
CPC .......... *B60G17/019* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60W 40/06* (2013.01); *B60W 40/076* (2013.01); *B60W 50/14* (2013.01); *B60W 2050/146* (2013.01); *G01F 23/0061* (2013.01); *G01F 23/0076* (2013.01); *G01F 23/2965* (2013.01); *B60W 2420/54* (2013.01); *B60K 37/02* (2013.01); *B60K 2350/1076* (2013.01); *B60W 2520/16* (2013.01); *B60W 2520/18* (2013.01); *B60W 2550/14* (2013.01); *B60W 2550/142* (2013.01); *B60W 2550/147* (2013.01); *Y02T 10/84* (2013.01); *F02D 11/105* (2013.01); *G01F 23/14* (2013.01); *G01S 15/02* (2013.01); *G01K 13/00* (2013.01); *B60Q 1/00* (2013.01); *B60R 99/00* (2013.01); *Y10S 903/93* (2013.01); *G01F 23/242* (2013.01); *G01F 23/265* (2013.01); *G06F 7/00* (2013.01); *Y10S 367/908* (2013.01)

(56) References Cited

U.S. PATENT DOCUMENTS

| | | | |
|---|---|---|---|
| 7,574,764 | B1 * | 8/2009 | Irving ............................ 14/69.5 |
| 2004/0036601 | A1 * | 2/2004 | Obradovich .................. 340/540 |
| 2006/0006990 | A1 * | 1/2006 | Obradovich .................. 340/439 |
| 2006/0202808 | A1 * | 9/2006 | Obradovich ............... 340/425.5 |
| 2008/0030313 | A1 * | 2/2008 | Obradovich .................. 340/439 |
| 2009/0159020 | A1 | 6/2009 | Hall et al. |

* cited by examiner

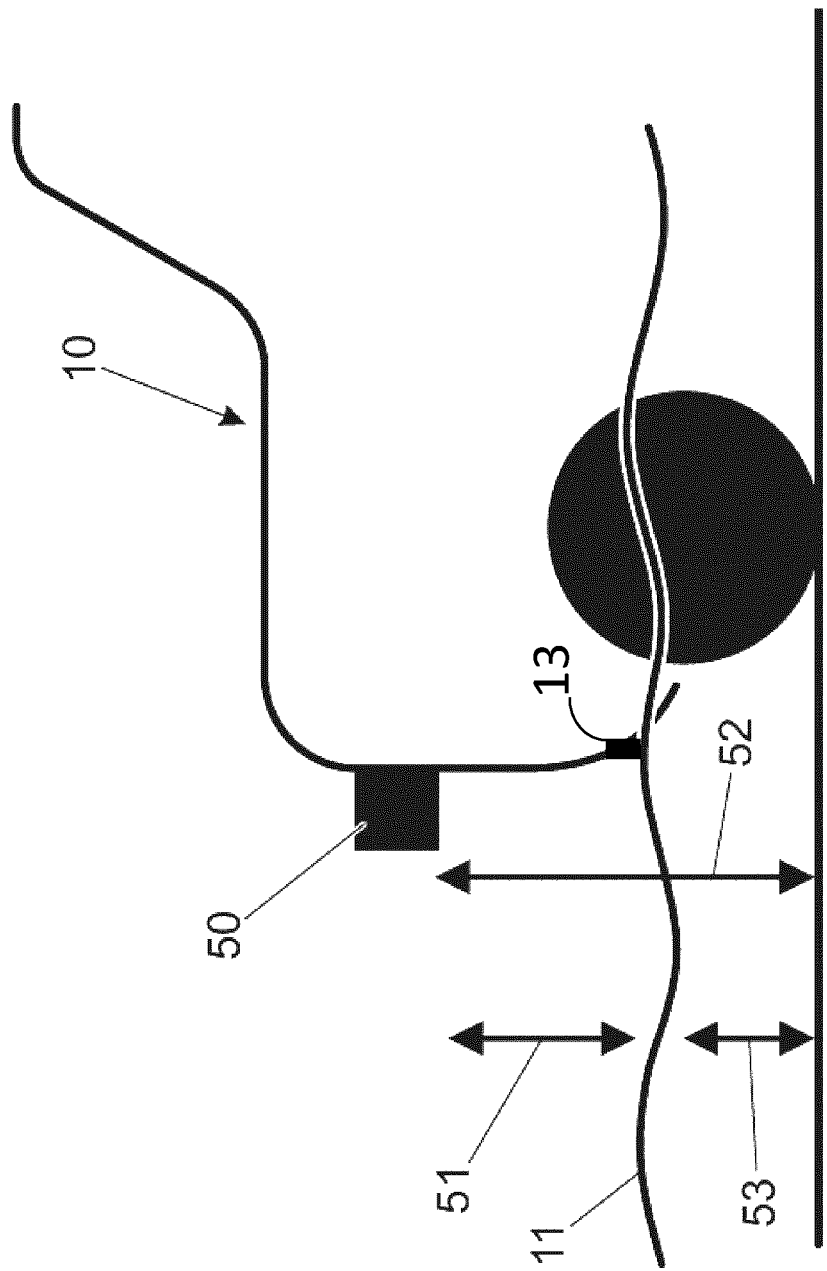

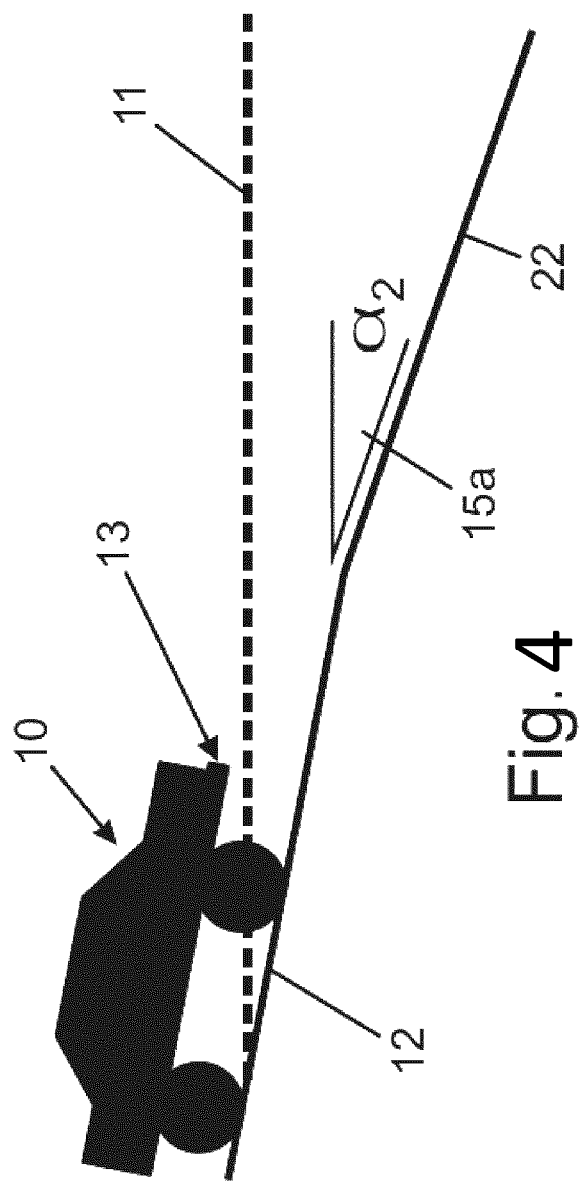

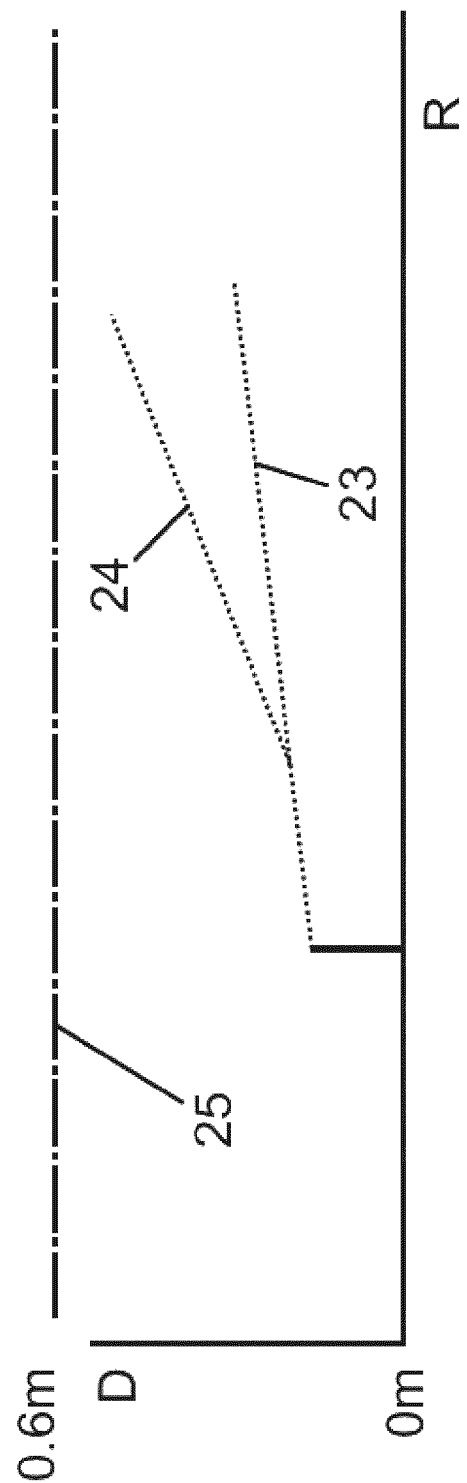

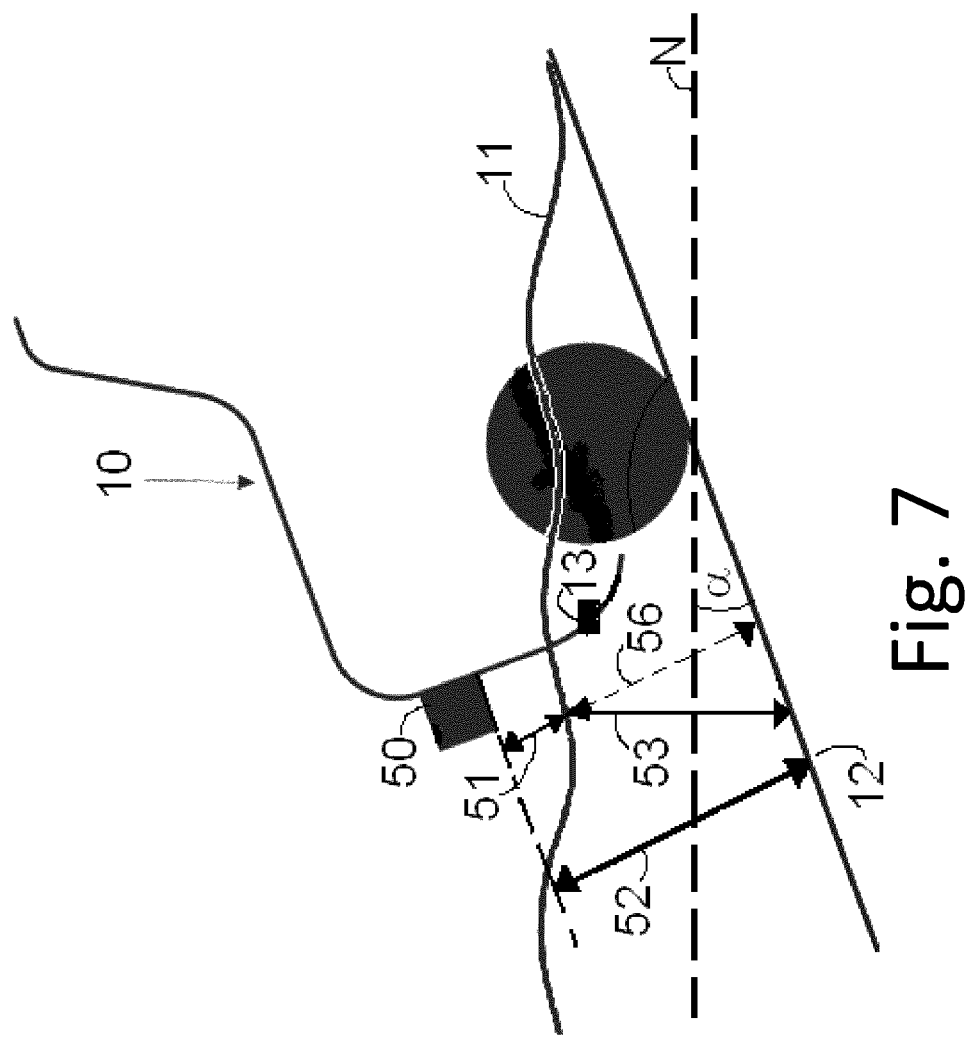

WADING DEPTH ESTIMATION FOR A VEHICLE

TECHNICAL FIELD

The present invention relates to system for estimating wading depth and optionally to a system for detecting wading. Aspects of the invention relate to a method, to a system, to a program and to a vehicle.

BACKGROUND

Vehicles are designed to travel through a body of water up to a finite depth, which may be referred to as a maximum wading depth. Beyond this maximum wading depth there is a risk that the vehicle engine and electronics may be damaged. Vehicles with off-road capability are designed to have the ability to wade through water at greater depth than conventional vehicles; however the maximum wading depth may differ from vehicle to vehicle. The maximum wading depth may also be dependent to some extent upon the skill of the driver. Prior to wading it is recommended to make an assessment of water depth and underwater terrain on foot. Impatience may result in an attempted traverse by vehicle without taking adequate precautions.

An on-board measurement of the depth of the water whilst wading may be an asset to the driver. An estimation or measurement of water depth some distance in front of the vehicle may also be an advantage, giving the driver advance indication of future immersion depth and information about an immersion limit.

Absolute measurement of water depth some distance in front of the vehicle by remote means is difficult and expensive. However an estimation of water depth may still provide a useful indication to the driver that caution may be necessary.

SUMMARY

Aspects of the invention relate to a wading vehicle water depth measurement apparatus, a vehicle, a program and a method as claimed in the appended claims.

According to another aspect of the invention for which protection is sought there is provided a method for use in a vehicle, comprising: receiving a signal from one or more sensors indicating wading and wading depth; receiving a signal from a sensor indicating attitude of the vehicle; and estimating, based upon a wading depth (D) as indicated by said sensor, attitude as indicated by said sensor and a distance ($R_{max}$) in advance of the location of the vehicle and/or a maximum wading depth ($D_{max}$) of the vehicle, a depth of water at a location ahead of the vehicle substantially in the direction of vehicle movement and/or the distance, ahead of the vehicle substantially in the direction of vehicle movement, to maximum wading depth.

Optionally, said estimating may be carried out in dependence on detecting the presence of water at least partially about the vehicle by receipt of a signal indicating wading and/or in dependence on detecting the attitude of the vehicle by receipt of a signal indicating attitude.

Optionally, the method may comprise continually re-estimating the depth of water whilst said vehicle is moving and wading is detected.

Optionally, the method may comprise adjusting vehicle suspension height. Further optionally, adjusting vehicle suspension height may be carried out according to the estimation of depth of water.

Optionally, the method may comprise indicating estimated depth of water to the vehicle driver.

Optionally, the method may comprise estimating the distance of vehicle movement to maximum wading depth, and indicating said distance to the vehicle driver, optionally on a display or by audible alarms or messages.

According to another aspect of the invention for which protection is sought, there is provided a vehicle comprising a wading depth sensor, an attitude sensor and a control unit configured to use signals of said wading depth and attitude sensors to compute an estimated wading depth at a location ahead of the direction of vehicle movement and/or to compute a distance ahead of the direction of vehicle movement to maximum wading depth.

Optionally, the vehicle may further comprise a sensor for indicating wading.

Optionally, said control unit may be configured to make an estimation of wading depth only upon detection of wading.

Optionally, said control unit may be configured to estimate wading depth only when said vehicle is moving.

Optionally, said control unit may be adapted to estimate a distance to maximum wading depth, and to indicate said distance to the vehicle driver.

Optionally, the vehicle may comprise a sensor for indicating wading adjacent a front perimeter thereof in the direction of movement, and comprising a fore and aft inclination sensor.

Optionally, said sensor for indicating wading may be an ultrasonic detector having a different response for operation in air and in water.

According to yet a further aspect of the invention, for which protection is sought, there is provided a system for a vehicle, the system comprising a control unit, a sensor for determining vehicle tilt and a sensor for indicating wading depth, wherein the control unit is configured to estimate wading depth in advance of a location of a vehicle and/or configured to estimate a maximum range of a vehicle in advance of a location of a vehicle, wherein said estimations are based upon a wading depth (D) as determined by the sensor for indicating wading depth, tilt as determined by the sensor for determining vehicle tilt and a distance ($R_{max}$) in advance of the location of the vehicle and/or a maximum wading depth ($D_{max}$) of the vehicle.

Optionally, the control unit may be configured to use the following equation or an approximation thereof in estimating a distance ($R_{max}$) in advance of the location of the vehicle:

$$R_{max} = \frac{D_{max} - D}{\text{Tan}(\alpha)}.$$

Further optionally, the control unit may be configured to use the following equation or an approximation thereof in estimating wading depth in advance of a location of a vehicle:

$$D(R) = R \cdot \text{Tan}(\alpha) + D.$$

According to an even further aspect of the invention for which protection is sought there is provided a non-transient computer readable memory having stored thereon a program for a computer configured to carry out said estimating a depth of water at a location ahead of the direction of vehicle movement and/or estimating the distance ahead of the direction of vehicle movement to maximum wading depth according to the method of the relevant preceding paragraphs and/or executable by a control unit of the vehicle of the relevant preceding paragraphs and/or executable by a control unit of the system of the relevant preceding paragraphs.

According to another aspect of the invention for which protection is sought there is provided a method of detecting the presence of water ahead of a vehicle, and of estimating the depth thereof, the method comprising: providing on a vehicle a wading sensor adapted to detect the presence of water ahead of or about the vehicle; providing on the vehicle an attitude sensor; and using information from said wading sensor and said attitude sensor to estimate a depth of water at a location ahead of the direction of vehicle movement.

This solution also has the potential to provide an estimate of water depth in front of the vehicle at no, or very little, additional hardware cost as the estimation is typically achieved in software of a vehicle electronic control unit (ECU) or the like.

Embodiments of the invention may provide a low cost solution by optionally using data from either the existing ultrasonic parking sensors or some other dedicated detection and depth measuring sensors, and/or an existing tilt sensor as inputs to an algorithm to compute an estimate of the depth of water ahead of the vehicle.

This proposal describes several simple optionally low-cost methods of estimating the presence of water and/or to a first approximation, the depth of water ahead of a vehicle. The invention optionally uses existing ultrasonic parking distance control (PDC) sensors, or dedicated liquid level sensors, and/or an existing tilt sensor mounted within the vehicle. Such ultrasonic sensors may exhibit a different response when immersed in water, and may thus be suitable to provide an indication of wading at a depth at least as high as the height of the sensor(s).

Various aspects are disclosed which are separately and in combination considered to be inventive, in particular the combination of wade sensor and/estimator, an electronic control system responsive to wade sensing, and an electronic driver display adapted to show wading and estimated wading depth by reference to a vehicle icon. In an embodiment a vehicle inclination sensor provides an input to the control system whereby vehicle inclination may also be displayed by reference to an inclined vehicle icon and by reference to a wading depth sensor to real time wading depth.

Embodiments of the invention optionally may utilize the existing parking distance control (PDC) sensors at front and rear of a vehicle to sense wading. An output from a sensor may cause a message to be displayed to the driver, for example not to switch off the engine when in water. The output may cause the suspension, typically air suspension, to be raised. The vehicle transmission may adopt an appropriate traction mode, such as 'mud and ruts' whereby vehicle performance is better adapted to wading conditions. A depth indicator may advise a driver of deep water.

Depth estimation may:
Assist drivers (with little/no off-road experience) to wade through water in an "URBAN" scenario (primarily flooded road situation).
Inform the driver of the capability of the vehicle.
Display the estimated wading level relative to the wading capability of the vehicle, and
Invoke a number of automatic vehicle behaviours to attempt to preserve the vehicle in wading conditions.
A typical operation sequence may be:
Approach water in vehicle.
Enter water in vehicle.
Automatic trigger of system as sensors detect wading.
Automatic trigger of driver display/human machine interface (HMI).
Wade in water, at less than maximum wading depth.
Exit water.
Revert to normal operation.

An ultrasound parking distance control sensor or sensors, as described above may be used as sensors of wading and optionally of real time wading depth. Conventional vehicle devices such as low-g accelerometers and gyroscopes can be adapted to give information about instant vehicle attitude, for example fore and aft pitch, and side to side lean.

The various aspects of the present invention may relate to ultrasonic sensors, vehicles and methods of use. It will however be appreciated that the inventions may be retrofitted to existing vehicles as a combination of hardware and software. Such software may adapt an existing vehicle with parking sensors to detection of wading or wading depth. In this specification use of the term 'wading depth' indicates wading at a depth sufficient to be detected by appropriately mounted sensors, but does not indicate any particular depth, nor that any vehicle with parking sensors can be adapted to wade merely by adaptation of the sensor controller. Wading may be deemed to occur in water of 200 mm depth, or more. As is well understood, many aspects of a vehicle may require modification to ensure successful wading, but the present invention may provide a convenient and economical way of monitoring the environment and providing onboard information.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments, unless there is incompatibility of features.

Reference in this specification to 'control unit' includes reference to any suitable controller for interpreting, translating and acting upon signals of a sensor. The control unit may comprise a distributed system and/or may be incorporated within a vehicle control system. Signals may be analogue or digital.

BRIEF DESCRIPTION OF THE DRAWINGS

Embodiments of the invention will now be described, by way of example only, with reference to the accompanying drawings in which:

FIG. 1B is a schematic illustration of a vehicle having a system for indicating that a vehicle is in a wading situation and for estimating wading depth, optionally using a substantially downward facing ultrasonic transmitter and receiver;

FIGS. 2 and 7 are a schematic illustrations of a vehicle having a system for estimating the depth of water in which the vehicle is positioned, using information about the attitude or inclination of the vehicle and utilising a substantially downward facing sensor;

FIG. 4 illustrates the vehicle and system of FIG. 3 in a situation where there is a variation of the slope of inclination of the ground surface upon which the vehicle is travelling;

FIG. 5 illustrates graphically the change in slope illustrated in FIG. 4; and

FIGS. 1A and 1B illustrate a vehicle 10 having a system 80 for estimating the depth of water in which the vehicle 10 is wading. A system 80, as illustrated in FIG. 1A, may optionally comprise a substantially downward facing sensor 50 that may optionally comprise a signal emitter and a signal receiver (for example a transducer). The system 80 also comprises a control unit (not shown) configured to monitor electrical signals transmitted and received by the one or more sensors 50. Further optionally the sensor 50 may be an ultrasonic transducer capable of emitting and receiving pulses of ultrasound.

Figure 1A:
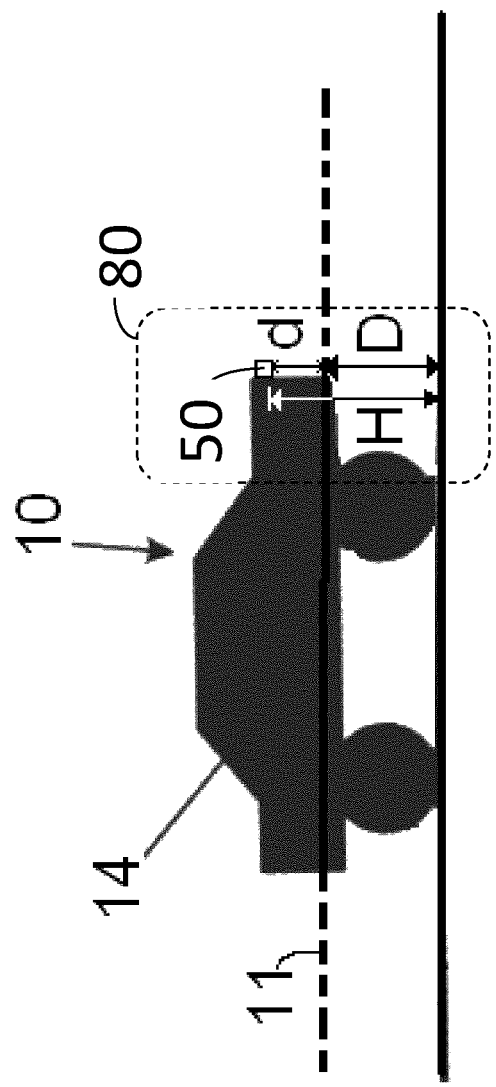
FIG. 1A is a schematic illustration of a vehicle having a system for estimating wading depth, optionally using a substantially downward facing ultrasonic transmitter and receiver.

The control unit may be configured to at least receive electrical signals issued by the sensor 50 and process them. The control unit may additionally be configured to issue electrical signals to the sensor 50 to control it. Optionally the system 80 may comprise more than one sensor 50. The sensor 50 may optionally be or include transducers (that can optionally convert acoustic signals to electrical signals and vice versa) that may preferably, but nevertheless optionally, be ultrasonic transducers. A single sensor 50 may be provided on the front of the vehicle 10 and a single sensor 50 may be provided on the rear of the vehicle 10. Whereas it is advantageous to position the sensor 50 at a leading edge of the vehicle 10 in order to obtain an earliest measurement of wading depth, it is also envisaged that in other embodiments of the invention the system may comprise one or more sensors positioned inward of a leading edge of a vehicle, for example on a lowermost surface of each of the wing mirrors of the vehicle 10.

Whereas the system 80 is suitably arranged with only one substantially downward facing sensor 50, it will be understood that a greater number of sensors 50 may be used in other embodiments. Optionally two sensors may be provided. The arrangement of the one or more sensors 50 may be used to provide additional information about topography of the surface upon which the vehicle 10 is driving. In other embodiments, the one or more sensors 50 may be arranged in a non-linear configuration and/or may be positioned at more than one height about the vehicle 10; and/or may be disguised or occluded from normal view for stylistic and/or other purposes. In use, the one or more sensors 50 are preferably downward facing, but may be moveable from a stowed position into a use position where they are substantially downward facing.

Furthermore, whereas the present embodiment is described as utilising ultrasonic transducers it will be understood from reading the foregoing that other suitable types of sensor or transducer may be used in alternative envisaged embodiments. For example, other ranges of acoustic transducer sensor such as an audible sound wave transducer may be used. It will be understood that other types of sensor may be suitable in replacement of or in conjunction with an ultrasonic sensor, for example, other acoustic, but non-ultrasonic sensors, an electromagnetic sensor optionally utilising an LED for emission of an infra-red signal and a photodiode for receiving a portion of the infra-red signal reflected from a surface.

The terms ultrasound and ultrasonic are used synonymously in the foregoing to mean sound waves or acoustic signals of a frequency that is outside of the typical human-hearing range, optionally taken to be greater than about 20 kHz and further optionally about 50 kHz. It will be understood that the present invention may be effectively employed using sonic sensors that emit and receive sound waves at frequencies lower than 20 kHz.

Ultrasonic sensors such as those currently used for parking distance control (PDC) typically comprise a diaphragm that can oscillate or vibrate that is disposed to face out from a vehicle bumper; a piezoelectric element positioned behind the diaphragm; and an integrated circuit. The same diaphragm may be used to emit an ultrasonic signal (in the form of sound waves) and receive an ultrasonic signal. The emission of ultrasonic signals, waves or pulses is typically controlled by the integrated circuit, which may optionally issue electrical signals to an electronic control unit for processing. In normal use as a parking sensor, the timing difference between the transmission of an ultrasonic pulse and receipt of a reflection of that same ultrasonic pulse can be used to measure the range or distance between the vehicle and an object in the vehicle path.

FIG. 1B illustrates schematically the vehicle 10 having a bonnet or front grille mounted downward facing ultrasonic transducer sensor 50, such as those used as parking distance control sensors. The sensor 50 in FIG. 1B and the sensor 50 in FIG. 1A are each configured to emit a signal or pulse of ultrasound and detect an echo of that signal. The echo is a reflection of the signal from a nearby surface and the time of flight of the signal to the surface and back can be used to calculate a distance d, 51 between the sensor 50 and the surface 11, which may be the surface of water 11 in which the vehicle 10 is wading.

The mounting height or in-use position H, 52 of the sensor 50 is a known parameter and may be stored in a memory associated with the control unit of the system 80. The control unit, knowing the mounting height or in-use height 52, H of the sensor 50 and the distance d between that sensor and a surface 11 (optionally determined by dividing the time taken by a signal to be returned to the sensor 50 by two and multiplying it by the speed of that signal in air) the depth of water 53, D can be calculated as follows (see also FIG. 1A):

$$D=H-d$$

A look-up table may give a mounting height or in-use height H, 52 associated with a vehicle suspension height setting (referred to as a ride height). A test mode may be provided for calibrating the mounting height on dry land, notwithstanding that the sensor 50 optionally may only be enabled whilst the vehicle is in a wading situation. Optionally, the control unit may determine, in real-time, the in-use position H of the sensor 50 by adjusting, a normal value H of the mounted height, by a correction for the ride height r of the vehicle.

In FIG. 1B a wading event indicator sensor 13 is disposed on the vehicle 10 at a location of height, h, which is preferably, but nevertheless optionally at a lower height than the height H of the substantially downward facing sensor 50. It is desirable for the wading event indicator sensor 13 to be mounted as low as possible so that an earlier indication of the presence of water in the path of the vehicle 10 can be given. According to an optional aspect, the wading event indicator sensor 13 may be an ultrasonic sensor, optionally disposed on the front bumper and may exhibit a change in response (as described in co-pending applications that are incorporated herein by a reference provided at the end of the description) when entering water, and thus may provide an indication of the vehicle being in a wading situation.

Figure 2:
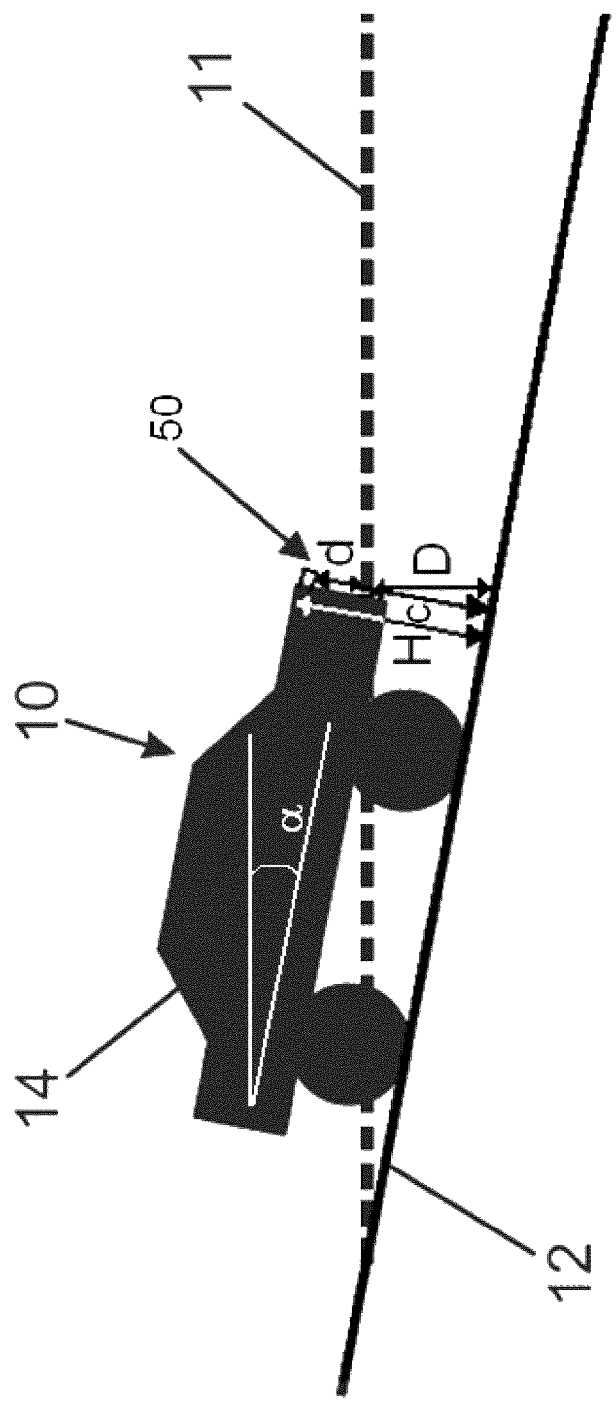

FIGS. 2 and 7 illustrate a vehicle 10 on an inclined surface 12 and entering water having a surface 11. The system 80 may comprise or utilise one or more tilt sensors 14 provided on the vehicle 10 which may be used by the control unit of the system to at least approximate an indication of fore and aft inclination α, 15. As illustrated in FIG. 2, the system 80 may be configured to approximate the depth of liquid in which the vehicle 10 is wading, again by using the distance d (as determined by the sensor 50 and system 80) between that sensor 50 and the surface 11; the known height H of the sensor 50 in use; the angle α of inclination and optionally the following relationship:

$$D = \frac{(H-d)}{\cos(\alpha)},$$

FIG. 7 illustrates a vehicle 10, not level, but on an incline 12. Information, optionally from a fore and aft tilt sensor 14 may provides vehicle inclination, and thus a correction factor 56 for the water depth calculation. Correction factor 56 is equivalent to H–d and can be used in the equation above in replacement of the terms H–d. It will be understood that the format of an algorithm used to carry out the computations required may be varied to accommodate various programming languages and other requirements; as such the implementation of various aspects of the invention may be done in many and various ways.

Figure 3A:
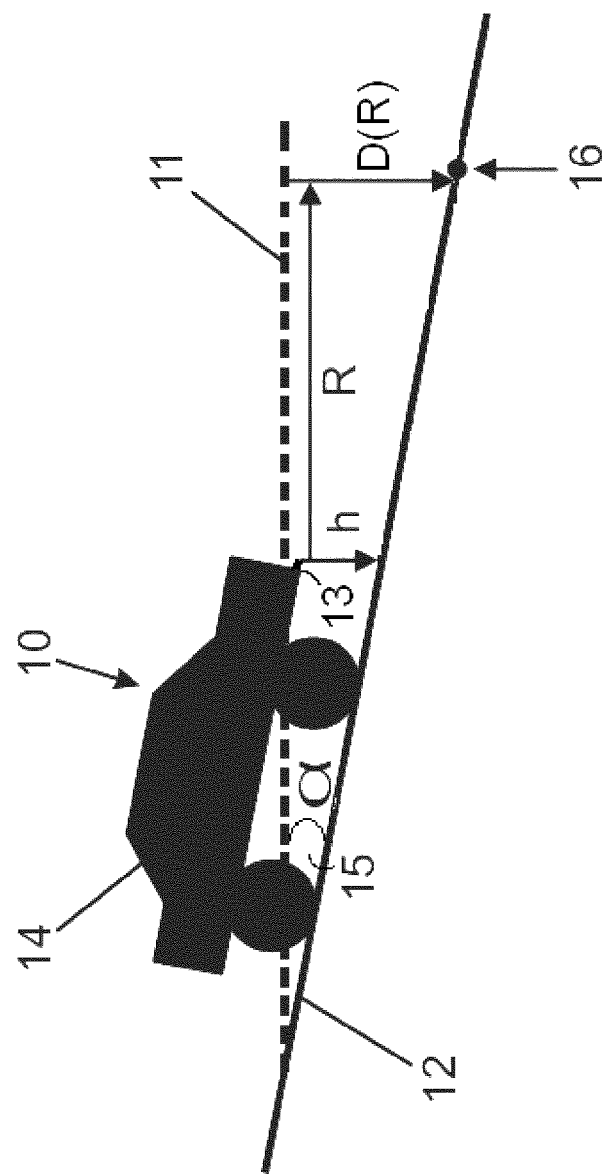
FIG. 3A is a schematic illustration of a vehicle having a system for indicating that a vehicle is in a wading situation and for estimating the depth of water ahead of the vehicle using information about the attitude or inclination of the vehicle.

Referring now to FIG. 3A, it is illustrated how a system 80 installed on the vehicle 10 is configured to and can be used to predict water depth at a substantially linear distance R ahead of the vehicle 10. The calculation, prediction or estimation of depth ahead of the vehicle 10 may be carried out immediately upon the system 80 realising by use of the wading event indication sensor 13 that the vehicle 10 is in water. As such an early prediction of ahead depth D(R) may be made using the height h of the wading event indication sensor 13 as an estimation of the current water depth and the following equation:

$$D(R) = R \cdot \mathrm{Tan}(\alpha) + h$$

Wherein, h is the mounting height or in-use height of a wading indicator sensor. It will be appreciated that the value of h may be fixed in relation to actual sensor height above ground in the horizontal vehicle condition, or according to a vehicle suspension height setting. A more accurate calculation of h may take into account vehicle inclination α so as to give the true vertical dimension when the vehicle is inclined.

Figure 3B:
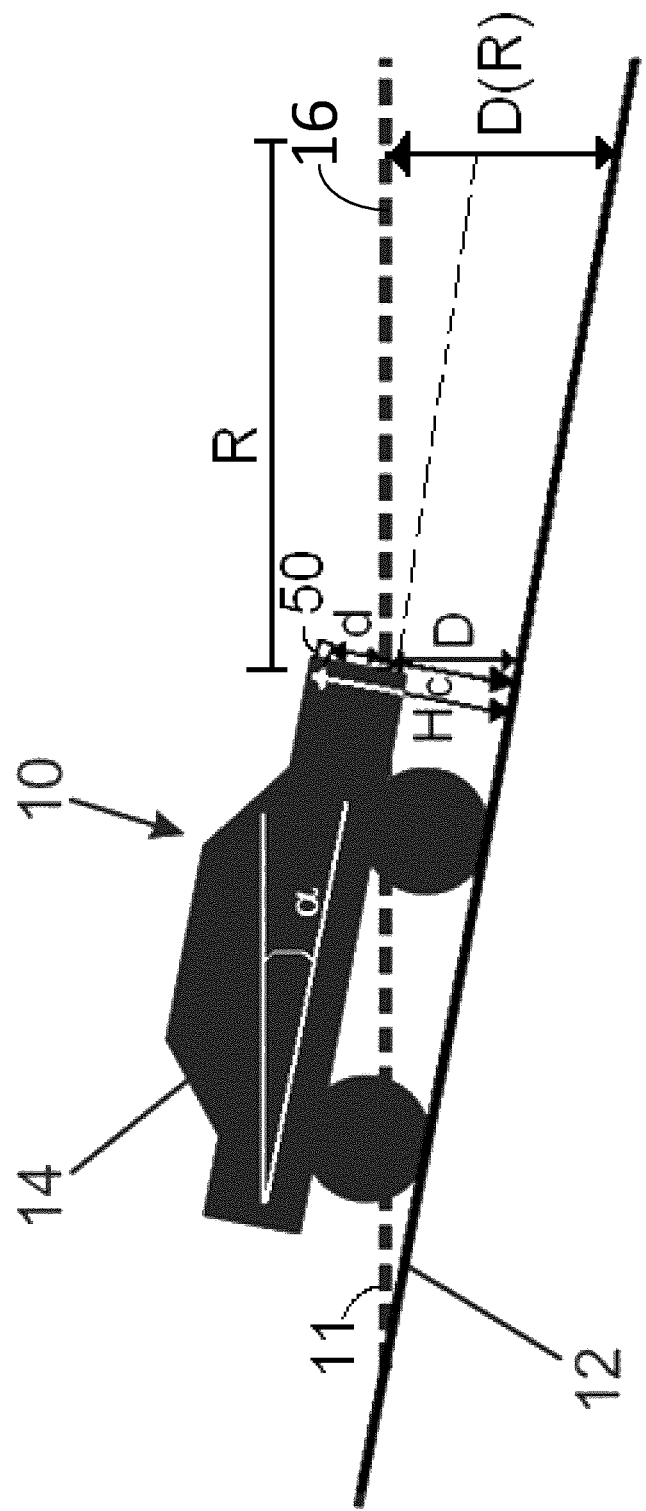
FIG. 3B is a schematic illustration of a vehicle having a system for estimating predictive vehicle wading depth optionally using a substantially downward facing ultrasonic transmitter and receiver.

Further optionally, and with reference to FIG. 3B, the following equation may be used to calculate a depth of water (or other liquid such as muddy water) D(R), at a distance R ahead of the current vehicle 10 position using a more accurate estimation of the depth of water D that the vehicle 10 is currently in (as calculated above for example, see FIGS. 2 and 7):

$$D(R) = R \cdot \mathrm{Tan}(\alpha) + D$$

Where D(R) is the estimated depth; R is the distance to the point of estimation 16, which may for example be 1 meter; α is the angle of inclination; and D is the depth of water that the vehicle 10 is already in. D may be calculated as described above.

Whereas, in an optional embodiment of the system 80, the prediction assumes that the angle of inclination α is constant, the prediction may be updated in real-time using a real-time signal feed of measured inclination angle α.

FIG. 4 illustrates an embodiment where the angle of inclination 15a increases in the forward path of the vehicle to give an increased slope 22. The control system of the vehicle 10 may monitor a change in angle of inclination α so as to indicate increasing slope. By the system 80 repeatedly conducting a prediction of the ahead range of the vehicle (either recalculating when α changes, or intermittently recalculating when α is measured) more accurate estimation of the point at which the vehicle may reach a maximum wading depth can be made.

FIG. 5 illustrates graphically a path estimation of the vehicle 10 according to successive increasing angles of inclination 23, 24 and a maximum wading depth 25 of 0.6 m.

Figure 6:
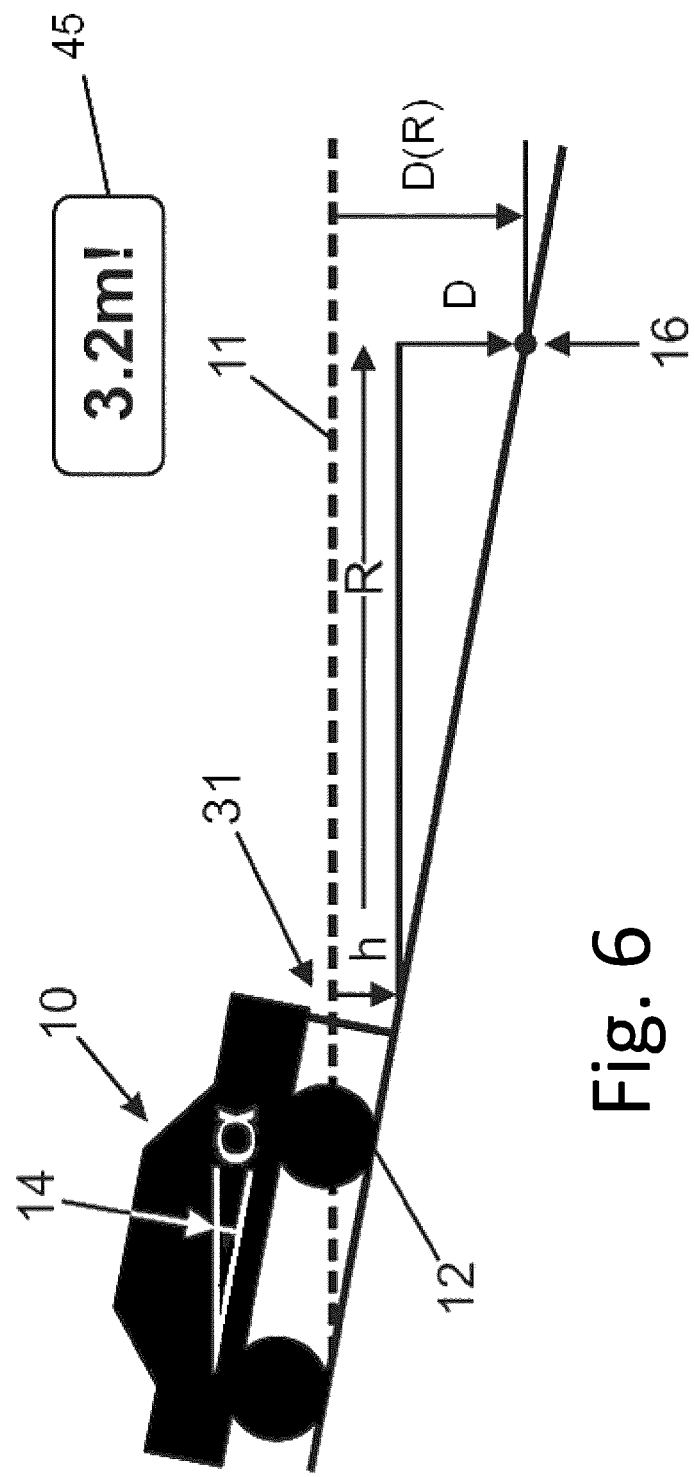
FIG. 6 further illustrates a system comprising a sensor for use in estimating a maximum distance that the vehicle may be able to travel based upon a maximum wading depth of the vehicle.

FIG. 6 illustrates a vehicle having a device 31 (shown schematically) for measuring depth of water. Any suitable device may be used; in particular a bonnet mounted downward facing ultrasonic sensor.

Continual measurement of actual immersion depth D may be made and compared with a maximum wading depth $D_{max}$ of the vehicle 10. Depth estimation ahead of the vehicle 10 may be carried out for single distance R ahead of the vehicle, for example 1 m, or at a number of discrete points, for example 50 points at 100 mm intervals.

Alternatively, or additionally, the system 80 may be configured to estimate a distance $R_{max}$ ahead of the vehicle at which it is estimated the maximum wading depth $D_{max}$ may be reached. This may be calculated by:

$$\frac{D_{max} - D}{\mathrm{Tan}(\alpha)} = R_{max}$$

Wherein α is the current angle of slope inclination and D is the current wading depth. The distance to maximum wading depth may be presented to the driver in the form of a dashboard warning 45, in analogue or digital form.

Information, data or signals from any of the sensors, 13, 14, 50 concerning water presence, water depth and tilt angle may be transmitted to a control unit or processor of the system 80 by a vehicle Bus system and/or via a vehicle controller area network (CAN).

The system 80 may be provided with a water surface sensor 50 and/or one or more water indication sensors 13 on the rear of the vehicle 10 and as such the afore described detection of wading; estimation of current wading depth and prediction of ahead wading depth may equally to forwards and reverse vehicle 10 movement, optionally using sensors at the leading edge of the vehicle.

A downward facing ultrasonic sensor 50 may be provided at the front of the vehicle, for example centrally in the radiator grill or on the bonnet, or at the side (for example on a lower surface of the wing mirrors) optionally provided that it has an output cone projecting beyond the vehicle front or rear wheels. Thus a sensor may be provided at the side and/or within the external body panels so long as a clear forward and downward line of sight is maintained. The height H, 52 of the depth measurement sensor 50 may be determined by vehicle body design and the maximum wading depth for which the sensor is intended to be operable.

It is envisaged that in other embodiments, the system 80 may comprise one or more sensors 50 that are angled non-perpendicularly toward a water surface 11, where this is the case, the algorithm executed by a processing unit of the system 80 may incorporate a further step to improve the accuracy of the value of d (the distance between the sensor 50 and the water surface 11) determined from the time of flight measured.

In the foregoing the term downwardly has been used to describe an optional position or orientation of the sensor 50. It will be understood that downwardly may mean perfectly normal, substantially normal, within about 0 to about 20° off normal.

The wading depth sensor may be activated automatically, or on demand by the driver. A driver override may be provided. The system of wading and/or depth sensing may be operational only below a pre-determined wading speed, and the vehicle speed may be limited to a pre-set maximum during wading.

It will be understood from the foregoing that the system 80 and its control unit may estimate, approximate or predict a depth of water in which the vehicle is wading or may wads in a number of ways. Exemplary calculations have been described, however, it is envisaged that many and various other ways for approximating or determining current or ahead wading depth will be suitable for use by a system 80 according to the invention. For example, any of the trigonometric functions mentioned in the above equations may be approximated by a fixed value or a series expansion may be computed to determine the value (such as a Taylor or Euler Series Expansion); further optionally, predefined values for each or any suitable term in the above described relationships may be listed in a look-up table (if appropriate) to be referenced during the computation of an estimation of wading depth. Additionally, or alternatively, or in combination, any of the trigonometric functions may be substituted in order to simplify the computation (and thereby optionally reduce the processing time needed in order to compute the compensation). It is envisaged that any of the trigonometric functions listed in the above equations may be computed by using an expansion series such as a Taylor Expansion Series or if appropriate an Euler Expansion Series and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function being interpolated.

Furthermore it will be understood that the order in which certain terms are computed may be adjusted to other embodiments of the invention and that a combination of calculation and/or referencing and/or approximation may be used for any or all of the relationships adapted to improve the accuracy of the detected variable.

Additionally it will be understood that other suitable devices may be utilised by a system 80 according to the invention to measure the depth D of water in which a vehicle 10 may be wading. As such the use of a downward facing sensor 50 is entirely optional. Other optional depth measurement devices that may be suitable for use in the system may be used and the depth measurement provided by one or more of them used in a computation of the distance at which maximum wading depth is likely to be reached or in the computation of the depth D(R) at a distance R ahead of the vehicle.

In the foregoing the term ahead has been used to refer to the path in front of the vehicle in its direction of travel. It will be understood that this may not be limited to exactly parallel with the line of travel of the vehicle.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072999 to Thuy-Yung TRAN and Edward HOARE, filed 15 Dec. 2011, entitled "Wading Detection System for a Vehicle";
3. PCT application No. PCT/EP2011/072986 to Thuy-Yung TRAN, Edward HOARE and Nigel CLARKE, filed 15 Dec. 2011, entitled "Vehicle Control System";
4. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
5. PCT application No. PCT/EP2011/072990 to Thuy-Yung TRAN, Edward HOARE and Nigel CLARKE, filed 15 Dec. 2011, entitled "Vehicle Orientation Device and Method";
6. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
7. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display";

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A method for use in a vehicle, comprising:
    receiving by a control unit a signal from one or more sensors indicating wading and wading depth;
    receiving by said control unit a signal from a sensor indicating attitude of the vehicle; and
    estimating, by said control unit and based upon: (i) a wading depth (D) as indicated by said signal from said one or more sensors, (ii) attitude as indicated by said signal from said sensor, and (iii) a distance ($R_{max}$) in advance of the location of the vehicle and/or a maximum wading depth ($D_{max}$) of the vehicle, a depth of water (D(R)) at a location ahead of the vehicle substantially in the direction of vehicle movement and/or the distance (R), ahead of the vehicle substantially in the direction of vehicle movement, to a maximum wading depth ($D_{max}$).

2. The method according to claim 1 wherein said estimating is carried out in dependence on detecting the presence of water at least partially about the vehicle by receipt of a signal indicating wading and/or in dependence on detecting the attitude of the vehicle by receipt of a signal indicating attitude.

3. The method of claim 1, comprising continually re-estimating the depth of water whilst said vehicle is moving and wading is detected.

4. The method of claim 1 comprising adjusting vehicle suspension height.

5. The method of claim 4 wherein adjusting vehicle suspension height is carried out according to the estimation of depth of water.

6. The method of claim 1, comprising indicating estimated depth of water to the vehicle driver.

7. The method of claim 1, comprising estimating by said control unit a distance ($R_{max}$) ahead of vehicle movement to maximum wading depth ($D_{max}$), and indicating said distance to the vehicle driver.

8. A vehicle comprising a wading depth sensor, an attitude sensor and a control unit configured to receive and use signals issued by said wading depth sensor and said attitude sensor to compute an estimated wading depth (D(R)) at a location ahead of the direction of vehicle movement and/or to compute a distance ($R_{max}$) ahead of the direction of vehicle movement at which a maximum wading depth ($D_{max}$) will be reached.

9. A vehicle according to claim 8, further comprising a wading event indicator sensor for indicating wading.

10. A vehicle according to claim 9, wherein said control unit is configured to compute said estimated wading depth (D(R)) at a location ahead of the direction of the vehicle movement and/or to compute a distance ($R_{max}$) ahead of the vehicle movement at which a maximum wading depth ($D_{max}$) will be reached only upon detection of wading.

11. A vehicle according to claim 8, wherein said control unit is configured to estimate wading depth (D(R)) only when said vehicle is moving.

12. A vehicle according to claim 8, wherein said control unit is adapted to indicate said distance ($R_{max}$) ahead of the direction of vehicle movement at which a maximum wading depth ($D_{max}$) will be reached to the vehicle driver.

13. A vehicle according to claim 8, comprising a wading event indicator sensor, positioned on the vehicle, for indicating wading that is disposed adjacent to a front perimeter of the vehicle in the direction of movement, and wherein said attitude sensor comprises a fore and aft inclination sensor.

14. A vehicle according to claim 13, wherein said wading event indicator sensor for indicating wading is an ultrasonic detector having different responses for operation in air and in water.

15. A non-transient computer readable memory having stored thereon a program for a computer of the vehicle of claim 8 configured to carry out said estimating a depth of water (D(R)) at a location ahead of the direction of vehicle movement and/or estimating the distance (R) ahead of the direction of vehicle movement to maximum wading depth ($D_{max}$).

16. A system for a vehicle, the system comprising a control unit, a sensor for determining vehicle tilt and a sensor for indicating wading depth, wherein the control unit is configured to estimate wading depth (D(R)) in advance of a location of a vehicle and/or is configured to estimate a maximum range of a vehicle in advance of a location of a vehicle, wherein said estimations are based upon a wading depth (D) as determined by the sensor for indicating wading depth, tilt as determined by the sensor for determining vehicle tilt and a distance ($R_{max}$) in advance of the location of the vehicle and/or a maximum wading depth ($D_{max}$) of the vehicle.

17. A system for a vehicle according to claim 16 wherein the control unit is configured to use the following equation or an approximation thereof in estimating a distance ($R_{max}$) in advance of the location of the vehicle:

$$R_{max} = \frac{D_{max} - D}{\text{Tan}(\alpha)}.$$

18. A system for a vehicle according to claim 16 wherein the control unit is configured to use the following equation or an approximation thereof in estimating wading depth (D(R)) in advance of a location of a vehicle:

$D(R) = R \cdot \text{Tan}(\alpha) + D.$

* * * * *